(12) United States Patent
Jiang et al.

(10) Patent No.: US 11,388,590 B2
(45) Date of Patent: Jul. 12, 2022

(54) CRYPTOGRAPHIC SECURITY IN MULTI-ACCESS POINT NETWORKS

(71) Applicant: Marvell World Trade Ltd., St. Michael (BB)

(72) Inventors: Jinjing Jiang, San Jose, CA (US); Manish Kumar, Clarksburg, MD (US); Hui-Ling Lou, Sunnyvale, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 342 days.

(21) Appl. No.: 16/687,718

(22) Filed: Nov. 19, 2019

(65) Prior Publication Data

US 2020/0162904 A1 May 21, 2020

Related U.S. Application Data

(60) Provisional application No. 62/770,077, filed on Nov. 20, 2018.

(51) Int. Cl.
| | |
|---|---|
| *H04L 29/06* | (2006.01) |
| *H04W 12/041* | (2021.01) |
| *H04W 12/069* | (2021.01) |
| *H04W 12/106* | (2021.01) |
| *H04W 12/0433* | (2021.01) |
| *H04W 84/12* | (2009.01) |

(52) U.S. Cl.
CPC ..... *H04W 12/041* (2021.01); *H04W 12/0433* (2021.01); *H04W 12/069* (2021.01); *H04W 12/106* (2021.01); *H04W 84/12* (2013.01)

(58) Field of Classification Search
CPC ............. H04W 12/041; H04W 12/106; H04W 12/0433; H04W 12/069; H04W 84/12

USPC ......................................................... 713/171
See application file for complete search history.

(56) References Cited

U.S. PATENT DOCUMENTS

| | | | |
|---|---|---|---|
| 8,560,848 B2 | 10/2013 | Liu et al. | |
| 9,246,876 B1 * | 1/2016 | Melam | .................... H04L 67/14 |
| 9,703,981 B1 * | 7/2017 | Marion | ................. H04L 63/061 |

(Continued)

FOREIGN PATENT DOCUMENTS

WO 2018175930 A1 9/2018

OTHER PUBLICATIONS

Gonzalez, "Multi-Agent Systems Applications in Energy Optimization Problems: A State-of-the-Art Review", Jul. 24, 2018, MDPI, pp. 1-28 (Year: 2018).*

(Continued)

*Primary Examiner* — Taghi T Arani
*Assistant Examiner* — Gregory A Lane (57) ABSTRACT

A method for communication in a WLAN includes onboarding, authenticating, and configuring respective BSSs of multiple access points in a multi-AP network. Respective cryptographic keys are generated for the multi-AP agents in the network by carrying out a handshaking procedure between the multi-AP controller and the multi-AP agents over the backhaul network. Upon detecting a predefined rekeying event in communications between the multi-AP controller and any given multi-AP agent, a new cryptographic key is generated for the given multi-AP agent by repeating the handshaking procedure, and applying the new cryptographic key in encrypting and authenticating messages following the rekeying event.

17 Claims, 4 Drawing Sheets

(56) References Cited

U.S. PATENT DOCUMENTS

| | | | | |
|---|---|---|---|---|
| 2004/0122976 A1* | 6/2004 | Dutta | ............... | H04L 65/608 |
| | | | | 709/245 |
| 2006/0013398 A1* | 1/2006 | Halasz | ............... | H04W 12/062 |
| | | | | 380/273 |
| 2013/0166910 A1* | 6/2013 | Wilkinson | ............... | H04L 9/32 |
| | | | | 713/168 |
| 2018/0206184 A1* | 7/2018 | Bahr | ............... | H04W 48/20 |
| 2019/0394642 A1* | 12/2019 | Nakarmi | ............... | H04W 76/27 |
| 2020/0008255 A1* | 1/2020 | Sharma | ............... | H04W 12/041 |

OTHER PUBLICATIONS

International Application # PCT/IB2019/059921 search report dated Feb. 7, 2020.
Wi-Fi Alliance Multi-AP Specification (version 1.0, released Jun. 18, 2018).
IEEE 802.11i, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 6: Medium Access Control (MAC) Security Enhancements, pp. 1-190, Jul. 23, 2004.
IEEE 1905.1, "IEEE Standard for a Convergent Digital Home Network for Heterogeneous Technologies", pp. 1-93, Apr. 12, 2013.
Wi-Fi Alliance, "Wi-Fi Certified Easy Connect™ Technology Overview", pp. 1-7, Jun. 2018.
Harkins et al., "Synthetic Initialization Vector (SIV) Authenticated Encryption Using the Advanced Encryption Standard (AES)", Request for Comments: 5297, pp. 1-26, Oct. 2008.

\* cited by examiner

CRYPTOGRAPHIC SECURITY IN MULTI-ACCESS POINT NETWORKS

CROSS-REFERENCE TO RELATED APPLICATION

This application claims the benefit of U.S. Provisional Patent Application 62/770,077, filed Nov. 20, 2018, which is incorporated herein by reference.

FIELD OF THE INVENTION

The present invention relates generally to wireless local area networks (WLANs), and particularly to protecting security of communications in a multi-access point WLAN.

BACKGROUND

Traditionally, Wi-Fi® deployments in homes and small offices have used a single, centrally-placed access point (AP) to serve an entire coverage space. This approach often provides uneven service, however, with inadequate coverage in some areas. Furthermore, rapid growth in the number of connected devices in the typical home or office creates an increasing demand for wireless access bandwidth, which may not be satisfied by a single AP.

In response to this need, the Wi-Fi Alliance has established a number of new standards for multi-AP networks, in which multiple APs, deployed at different locations in a facility (such as a home or office) work together to extend Wi-Fi coverage and enhance quality of service. In contrast to traditional Wi-Fi APs, which operate independently of one another, using their own, respective basic service set (BSS) configurations, the APs in a multi-AP network are centrally controlled by a multi-AP controller over a backhaul network. The relevant standards are summarized in the Wi-Fi Alliance Multi-AP Specification (version 1.0, released Jun. 18, 2018), which is available at wi-fi.org. Deployment of multi-AP networks raises new security concerns, which are addressed only in part by current standards.

SUMMARY

Embodiments of the present invention that are described hereinbelow provide improved methods for secure communications in a network of multiple access points, as well as access points implementing such methods.

There is therefore provided, in accordance with an embodiment of the invention, a method for communication in a wireless local area network (WLAN) system. The method includes onboarding, authenticating, and configuring respective basic service sets (BSSs) of multiple access points in a multi-access point (multi-AP) network by a multi-AP controller, by communication over a backhaul network in the WLAN system between the multi-AP controller and respective multi-AP agents in the access points. Respective cryptographic keys are generated for the multi-AP agents by carrying out a handshaking procedure between the multi-AP controller and the multi-AP agents over the backhaul network. Messages are exchanged between the multi-AP controller and the multi-AP agents over the backhaul network while encrypting and authenticating the messages using the respective cryptographic keys. Upon detecting a predefined rekeying event in communications between the multi-AP controller and any given multi-AP agent, a new cryptographic key is generated for the given multi-AP agent by repeating the handshaking procedure, and applying the new cryptographic key in encrypting and authenticating the messages following the rekeying event. In response to the encrypted and authenticated messages received by the respective multi-AP agents, the access points associate and communicate over wireless fronthaul links with client stations (STAs) in the WLAN system using the respective BSSs configured by the multi-AP controller.

In one embodiment, detecting the rekeying event includes detecting expiration of a timer. Alternatively or additionally, exchanging the messages includes applying successive sequence numbers to the messages, and detecting the rekeying event includes detecting that the sequence numbers have reached a predefined limit. Further additionally or alternatively, detecting the rekeying event includes detecting a change in a topology of the multi-AP network in response to the messages. In a disclosed embodiment, detecting the change in the topology includes receiving a message with respect to steering of a STA to a given BSS.

In some embodiments, encrypting and authenticating the messages exchanged between the between the multi-AP controller and the multi-AP agents includes applying successive sequence indicators to the messages, and incorporating the successive sequence indicators as associated data in an authenticated encryption of the messages.

In a disclosed embodiment, generating the cryptographic keys includes provisioning respective fixed master keys of the multi-AP agents by communication over the backhaul network between the multi-AP controller and the onboarded multi-AP agents, and using the provisioned master keys, generating respective transit keys for use in encrypting and authenticating the messages.

There is also provided, in accordance with an embodiment of the invention, a method for communication in a wireless local area network (WLAN) system. The method includes onboarding, authenticating, and configuring respective basic service sets (BSSs) of multiple access points in a multi-access point (multi-AP) network by a multi-AP controller, by communication between the multi-AP controller and respective multi-AP agents in the access points over a backhaul network in the WLAN system. Respective cryptographic keys for the multi-AP agents are generated by carrying out a handshaking procedure between the multi-AP controller and the multi-AP agents over the backhaul network. Messages, having respective, successive sequence indicators, are exchanged between the multi-AP controller and the multi-AP agents over the backhaul network while encrypting and authenticating the messages using the respective cryptographic keys and incorporating the respective sequence indicators as associated data in the encrypted and authenticated messages. In response to the encrypted and authenticated messages received by the respective multi-AP agents, the access points associate and communicate over wireless fronthaul links with client stations (STAs) in the WLAN system using the respective BSSs configured by the multi-AP controller.

In some embodiments, exchanging the messages includes transmitting data packets, each data packet including a header and a payload containing a plurality of type-length-value (TLV) elements, including at least one first TLV element containing control data, a second TLV element containing the associated data, and a third TLV containing an authentication value, and encrypting and authenticating the messages includes computing the authentication value using the respective cryptographic keys and the associated data. In a disclosed embodiment, computing the authentication value includes calculating a synthetic initialization vector.

In one embodiment, the sequence indicators include message sequence numbers, and exchanging the messages includes incrementing the message sequence numbers over a succession of the messages. Additionally or alternatively, the sequence indicators include time stamps, and exchanging the messages includes incrementing the time stamps over a period of time during which the messages are transmitted.

There is additionally provided, in accordance with an embodiment of the invention, a wireless local area network (WLAN) system, including a plurality of access points (APs), which are configured to associate and communicate over wireless fronthaul links with client stations (STAs) in the WLAN system using respective basic service sets (BSSs) under control of respective multi-access point (multi-AP) agents running in the access points. A multi-access point (multi-AP) controller is configured to communicate over a backhaul network in the WLAN system with the respective multi-AP agents in the access points so as to onboard, authenticate, and configure the respective BSSs of the access points to define a multi-AP network. The multi-AP controller and multi-AP agents are configured to generate respective cryptographic keys for the multi-AP agents by carrying out a handshaking procedure between the multi-AP controller and the multi-AP agents over the backhaul network, and to exchange messages over the backhaul network while encrypting and authenticating the messages using the respective cryptographic keys. The multi-AP controller and multi-AP agents are configured to detect a predefined rekeying event in communications between the multi-AP controller and any given multi-AP agent, to generate a new cryptographic key for the given multi-AP agent by repeating the handshaking procedure, and to apply the new cryptographic key in encrypting and authenticating the messages following the rekeying trigger.

The present invention will be more fully understood from the following detailed description of the embodiments thereof, taken together with the drawings in which:

DETAILED DESCRIPTION OF EMBODIMENTS

A multi-AP network includes two types of logical entities: one multi-AP controller and one or more multi-AP agents, which run in various APs under the control of the multi-AP controller. The APs are physically connected to the multi-AP controller in a tree topology, by backhaul links that may be either wired, such as Ethernet links, or wireless, such as Wi-Fi links between the APs. The backhaul links operate in accordance with the IEEE 1905.1 protocol, which defines a unified framework for wireline standards, such as IEEE 802.3, and wireless standards, such as IEEE 802.11. The multi-AP agents are onboarded, authenticated, and configured for network access using a device provisioning protocol (DPP) defined by the above-mentioned Multi-AP Specification.

The multi-AP controller receives measurements and capability data from the multi-AP agents, including information regarding both APs and client stations (STAs), and triggers AP control-related commands and operations on the multi-AP agents. The multi-AP controller also provides onboarding functionality to onboard and provision APs into the multi-AP network. Based on the information received from the multi-AP agents, the multi-AP controller sends commands to the multi-AP agents to configure the 802.11 interface (for example, configuring the BSS, including transmit power) of each of the radios of the participating APs for communicating with STAs in the WLAN. The multi-AP controller can also send steering control messages, indicating the BSS to which the APs should attempt to steer each STA that is associated with the network in order to balance network load and facilitate roaming among the APs.

As part of its onboarding functionality, the multi-AP controller authenticates and establishes secure communications with multi-AP agents joining the network. Communications between the multi-AP controller and multi-AP agents are then secured by the underlying authentication of the backhaul network. For example, backhaul Wi-Fi links are secured by the symmetric encryption protocol mandated by WI-FI Protected Access II (WPA2), as defined in the IEEE 802.11i standard. This feature is intended to protect messaging between the multi-AP controller and multi-AP agents against out-of-network eavesdropping and other cyber-attacks.

Multi-AP control messages are carried over the backhaul network using control data message units (CMDUs) as defined by the IEEE 1905.1 standard. Each CMDU includes a header in a predefined format, followed by a payload containing a one or more type-length-value (TLV) elements. Chapter 17 of the above-mentioned Multi-AP Specification defines a list of TLV elements that can be used in various sorts of control messages.

To support secure communications over the backhaul network in a multi-AP system, the multi-AP controller and multi-AP agents use WPA2 symmetric encryption (as defined in the IEEE 802.11i standard) over the IEEE 1905.1 protocol layer, as explained above. As part of the process of onboarding, authenticating, and configuring the multi-AP agents, using the above-mentioned device provisioning protocol (DPP), a shared secret is generated between each multi-AP agent and the multi-AP controller, known as the pairwise master key (PMK). This PMK serves as a fixed master key in generating a respective cryptographic key for the multi-AP agent, referred to as a pairwise transit key (PTK, also referred to as a pairwise transient key). The PTK is generated in an exchange of four messages between the multi-AP agent and the multi-AP controller, known as a "four-way handshake," as defined by IEEE 802.11i. After this handshake is completed, the PTK is used in encrypting and authenticating the messages that are exchanged between the corresponding multi-AP agent and the multi-AP controller over the backhaul network The IEEE 1905.1 standard, however, defines a very specific message format, with only a small range of different messages, as provided by the closed list of TLV elements in the standard. On this basis, an eavesdropper on the backhaul network between the multi-AP controller and a given multi-AP agent may be able to reconstruct the respective PTK based on cryptanalysis of a small number of intercepted messages. The eavesdropper will then be in a position to use the reconstructed PTK in receiving and injecting messages into the multi-AP network.

Even without reconstructing the PTK, the eavesdropper may still attempt to mount a replay attack, in which the eavesdropper intercepts messages from a given multi-AP agent to the multi-AP controller, for example, and then re-injects the messages into the backhaul network in an attempt to masquerade as the multi-AP agent. In accordance with IEEE 802.11i, the messages contain an authentication value, such as a message authentication code (MAC), which is computed over the contents of the message using the PTK. The multi-AP controller will check the authentication value in the replayed message and, if the message contents have not changed, the MAC may still be valid. The multi-AP controller will then consider the message to be legitimate, opening the way to further communications by the eavesdropper.

Embodiments of the present invention address these potential security weaknesses by adding novel communication security features into the multi-AP backhaul network communications. Some embodiments provide for generating a new cryptographic key, for example, a new PTK, in response to a predefined type of event (referred to herein as a "rekeying event") that may occur in communications between the multi-AP controller and agents. Generation of a new key in this fashion, and using the new key in place of the previous one in encrypting and authenticating the messages following the rekeying event, make it difficult for malicious parties to recover the keys by cryptanalysis and then use them in mounting an attack before the key is changed.

In these embodiments, the multi-AP controller and agents carry out a handshaking procedure to generate an initial cryptographic key (such the above-mentioned four-way handshake and PTK), and then encrypt and authenticate messages using this initial key. Upon detecting a rekeying event in communications between the multi-AP controller and a given multi-AP agent, the controller and agent repeat the handshaking procedure to generate a new cryptographic key. The rekeying event may comprise, for example, expiration of a timer or detecting that the sequence numbers of packets exchanged between the multi-AP controller and agent have reached a predefined limit. Alternatively or additionally, the rekeying event may comprise a change in the topology of the multi-AP network, such as steering of a STA to a given BSS (i.e., to a given AP) under instructions of a message carried over the backhaul network.

Other embodiments that are described herein incorporate sequence indicators in the messages carried over the backhaul network and incorporate these sequence indicators as associated data in encrypting and authenticating the messages. The sequence indicators are incremented from message to message and thus may comprise, for example, successive message sequence numbers or time stamps. The associated data bind the encrypted ciphertext in the message to the specific sequence indicator of the message in which it is contained. Incorporation of associate data in this manner thus deters an attacker from "replaying" the encrypted ciphertext in the payload of a new message: Because the new message must have a new sequence indicator in order to be considered valid, the recipient will detect that the encryption of the replayed payload does not match the associated data in the new message and will accordingly reject the message.

For example, in one such embodiment, the associated data, comprising the message sequence indicators and possibly other data, as well, are inserted in a predefined TLV element of the data packets that are transmitted over the backhaul network, along with other TLV elements containing encrypted control data. The multi-AP controller or agent transmitting the data packets encrypts the control data using the appropriate cryptographic key and computes an authentication value using the cryptographic key and the associated data. This authentication value is inserted in another TLV element in the data packets, and then is used by the receiving party in verifying the validity of the encrypted message.

The two different sorts of security enhancements that are provided by the embodiments described herein—rekeying in response to certain events, and using message sequence indicators as associated data—may advantageously be implemented together in order to enhance the security of a multi-AP network against attack. Alternatively, either of these sorts of security enhancements may be used independently of the other, possibly in conjunction with other security measures that are known in the art. Although the present description of these embodiments refers to specific standards that are currently used in multi-AP networks, the principles of the present invention may similarly be applied, mutatis mutandis, in other networks operating under different standards that are or may come to be known in the art.

Figure 1:
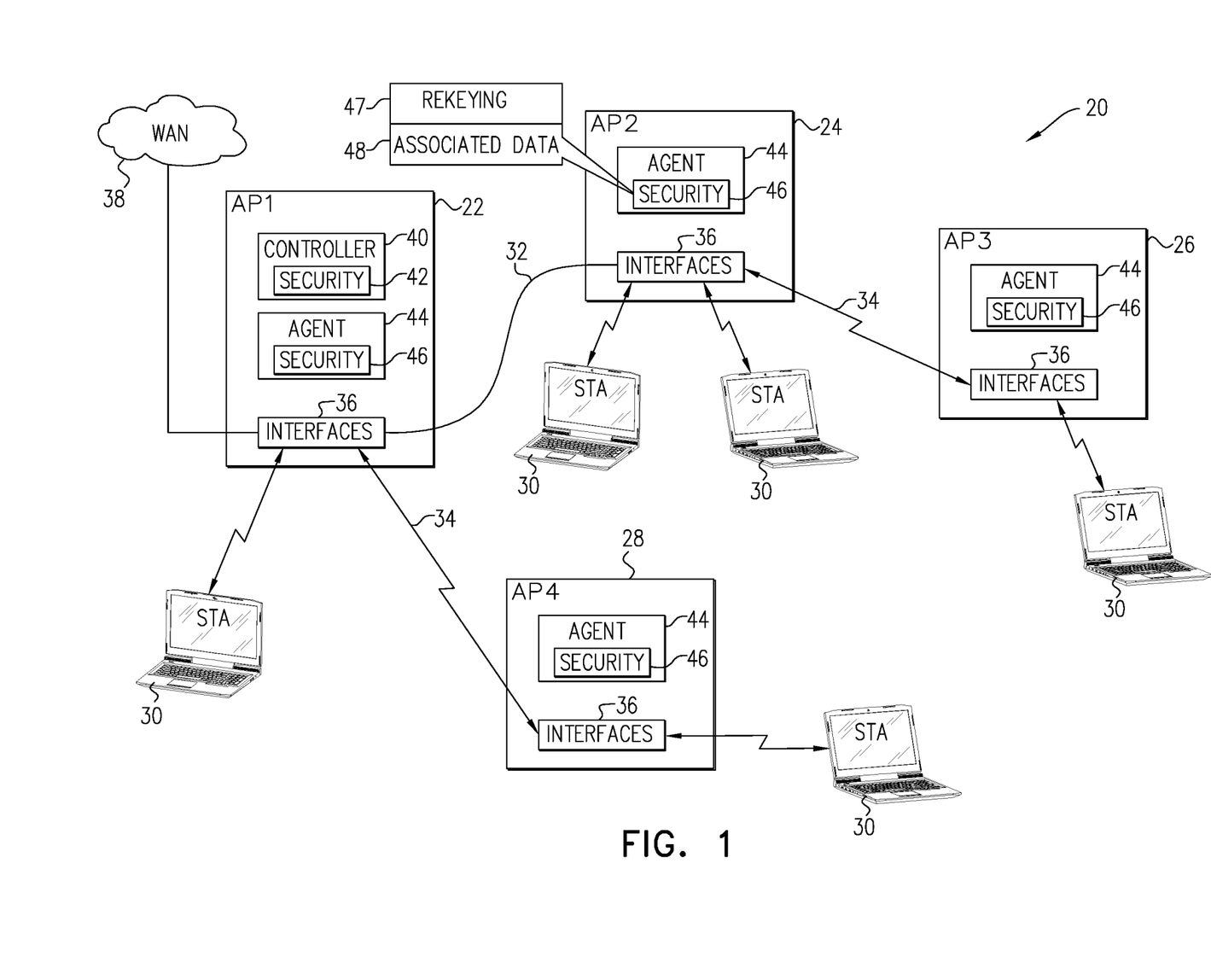
FIG. 1 is a block diagram that schematically illustrates a multi-AP wireless network, in accordance with an embodiment of the invention.

FIG. 1 is a block diagram that schematically illustrates a WLAN system 20 that is configured as a multi-AP network, in accordance with an embodiment of the invention. System 20 comprises multiple APs 22, 24, 26, 28, which communicate over wireless fronthaul connections with client stations (STAs) 30. The APs communicate among themselves over a backhaul network, which is made up of backhaul links 32, 34 arranged in a tree topology. The backhaul links include, in this example, a wired backhaul link 32, such as an Ethernet link, and wireless backhaul links 34, such as Wi-Fi links. To support their fronthaul and backhaul communications, APs 22, 24, 26, 28 comprise respective communication interfaces 36, which typically include wireless interfaces operating in accordance with IEEE 802.11 standards, and possible also wireline interfaces, operating in accordance with applicable Ethernet or powerline communication standards, for example.

AP 22 in this example also serves as a system gateway, connecting system 20 to a wide area network (WAN 38), such as the public Internet. AP 22 runs a multi-AP controller 40, which interacts with and controls the operation of multi-AP agents 44 on APs 22, 24, 26 and 28, in an embodiment. Controller 40 and agent 44 typically are implemented as software processes, running on host processors in the respective APs. Although it is often convenient that multi-AP controller 40 run on the AP that serves as the system gateway as in the present example, the multi-AP controller alternatively may run on another one of the APs, or on a separate gateway or other hardware unit that is not an AP.

As noted earlier, multi-AP controller 40 onboards, authenticates, and configures the respective basic service sets (BSSs) of access points 22, 24, 26, 28, by communication with multi-AP agents 44 over backhaul links 32, 34. In response to instructions conveyed by multi-AP controller 40, agents 44 in the access points control respective interfaces 36 so as to associate and communicate with STAs 30 over fronthaul links, using the respective BSSs configured by the multi-AP controller.

Multi-AP controller 40 and multi-AP agents 44 comprise respective security modules 42, 46, which they use in authenticating and establishing secure connections between the multi-AP controller and agents. Among other functions, security modules 42 and 46 generate respective cryptographic keys for multi-AP agents 44, including particularly respective PMK and PTK values in the present embodiment, by carrying out a handshaking procedure over the network of backhaul links 32, 34. Security modules 42 and 46 use these cryptographic keys in encrypting and authenticating the messages that multi-AP controller 40 and multi-AP agents 44 exchange over the backhaul links. In some embodiments, multi-AP controller 40 and multi-AP agents 44 apply successive sequence indicators to the messages that they exchange over the backhaul network, and security modules 42 and 46 incorporate the respective sequence indicators as associated data 48 in the encrypted and authenticated messages. Additionally or alternatively, security modules 42 and 46 apply a rekeying functionality 47 to detect predefined rekeying events in communications between multi-AP controller 40 and multi-AP agents, and in response to such events, generate new cryptographic keys by repeating the handshaking procedure.

Although FIG. 1 shows a particular multi-AP network topology and configuration in system 20, and examples of secure communications are described hereinbelow with specific reference to this system, the principles of the present invention are by no means limited to this topology or configuration. Rather, the methods and modules used in system 20 may similarly be applied in multi-AP networks comprising larger or smaller numbers of APs, with other topologies made up of various types of wired and/or wireless backhaul links. All such implementations are considered to be within the scope of the present invention.

Figure 2:
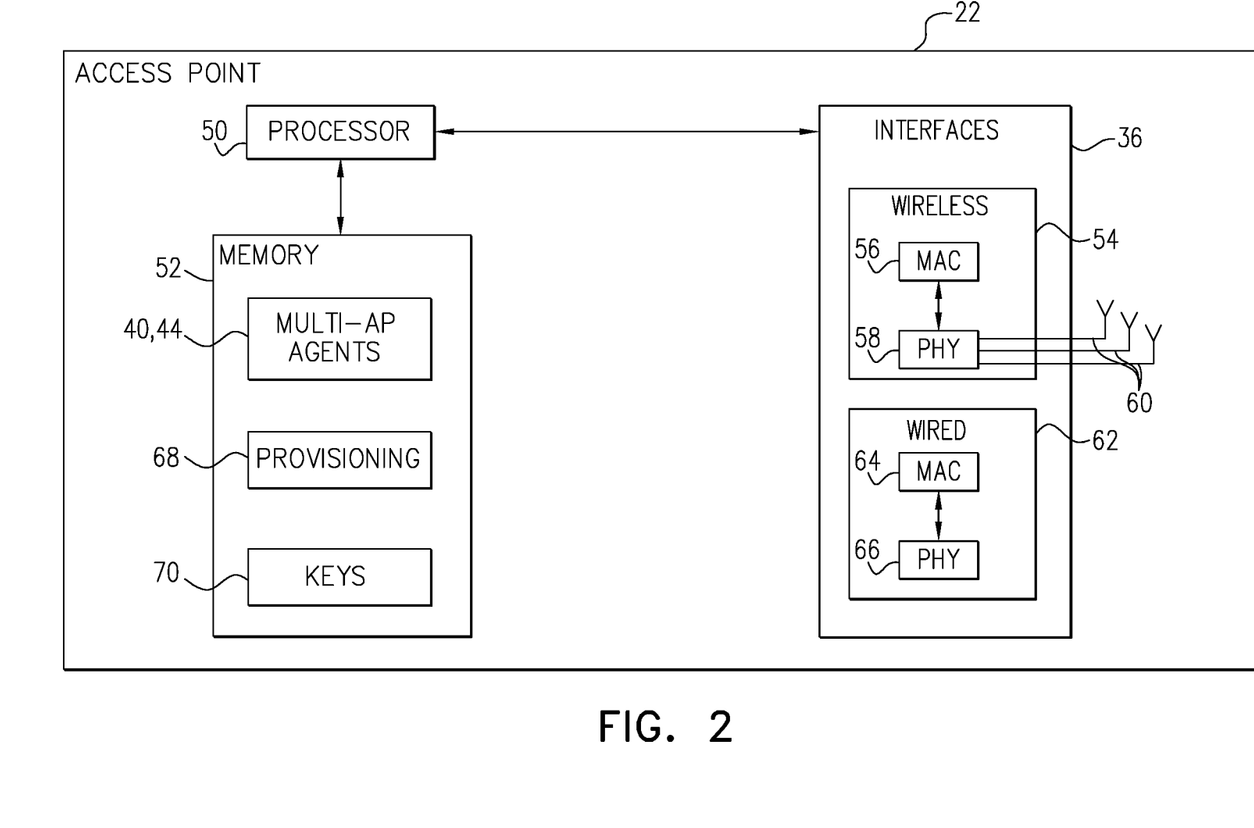
FIG. 2 is a block diagram that schematically shows details of a wireless AP in the network of FIG. 1, in accordance with an embodiment of the invention.

FIG. 2 is a block diagram that schematically shows details of AP 22, in accordance with an embodiment of the invention. APs 24, 26 and 28 are typically of similar construction to AP 22 and therefore will not be described here in detail. The differences in functionality of the access points that are shown in FIG. 1 can be implemented in software, i.e., multi-AP controller 40 may run on access points other than AP 22.

AP 22 comprises interfaces 36, including both a wireless network interface 54 and a wired network interface 62. Wireless interface 54 comprises MAC and PHY interface circuits 56 and 58, which operate in accordance with the applicable IEEE 802.11 specifications. PHY interface circuit 58 comprises one or more radio transceivers, which are connected to antennas 60. Typically (although not necessarily), wireless interface 54 comprises multiple transceivers of this sort, with one or more antennas connected to each transceiver. In general, the components of PHY and MAC interface circuits 56 and 58 are implemented in dedicated or programmable hardware logic circuits, on a single integrated circuit chip or a set of two or more chips that are fabricated as a module or coupled together on a printed circuit board, for example.

AP 22 may communicate with other APs in system 20 via wireless network interface 54 and/or via wired network interface 62. Alternatively, AP 22 may communicate with other APs in system 20 via a wired network link 32. For example, wired network interface 62 comprises suitable Ethernet MAC and PHY interface circuits 64 and 66. On the other hand, to communicate over wireless link 34, wireless interface 54 may use the bandwidth of the WLAN in particular time slots (i.e., TDMA) and/or within a particular frequency channel or channels (FDMA). (Jagged arrows in FIG. 1 represent wireless links, as opposed to the simple curve representing wired link 32.)

The operations of AP 22, including multi-AP control and agent functions, are controlled by a host processor 50, which typically comprises a programmable processor, along with a suitable memory 52 and other resources (not shown). Processor 50 is programmed in software or firmware to carry out various control and communication functions in AP 22, including the multi-AP network functions that are described herein. The software run by host processor 50 typically is stored in tangible, non-transitory computer-readable media, such as a suitable RAM or ROM memory in various embodiments, which may be incorporated as a part of memory 52. Host processor 50 may be implemented together with the elements of interfaces 36 in a single system-on-chip (SoC), or as a separate chip or chip set.

Memory 52 contains program code run by host processor 50, as well as associated data, for the purpose of carrying out the functions of multi-AP controller 40 and multi-AP agent 44, including security modules 42 and 46 (FIG. 1). After onboarding by multi-AP controller 40, the multi-AP agent 44 of each AP 22, 24, 26, 28 receives and holds provisioning data 68, which typically is assigned using the device provisioning protocol (DPP) defined by the above-mentioned Multi-AP Specification. Provisioning data 68 define the configuration of the access point connections and BSSID, as well as security credentials for communication with multi-AP controller 40.

In addition, in embodiments of the present invention, multi-AP agent 44 stores cryptographic keys 70, such as the PMK and PTK, in memory 52, for use in communication with multi-AP controller 40. (In some embodiments, cryptographic keys 70 also include cryptographic values for use in communication with other multi-AP agents, for example as described in U.S. patent application Ser. No. 16/662,054, filed Oct. 24, 2019, whose disclosure is incorporated herein by reference.) A number of example methods for generation, update, and use of keys 70 are described hereinbelow with reference to the figures that follow. Alternatively, other suitable methods of key generation, authentication and encryption that are known in the art may be used for the present purposes and are considered to be within the scope of the present invention.

Figure 3:
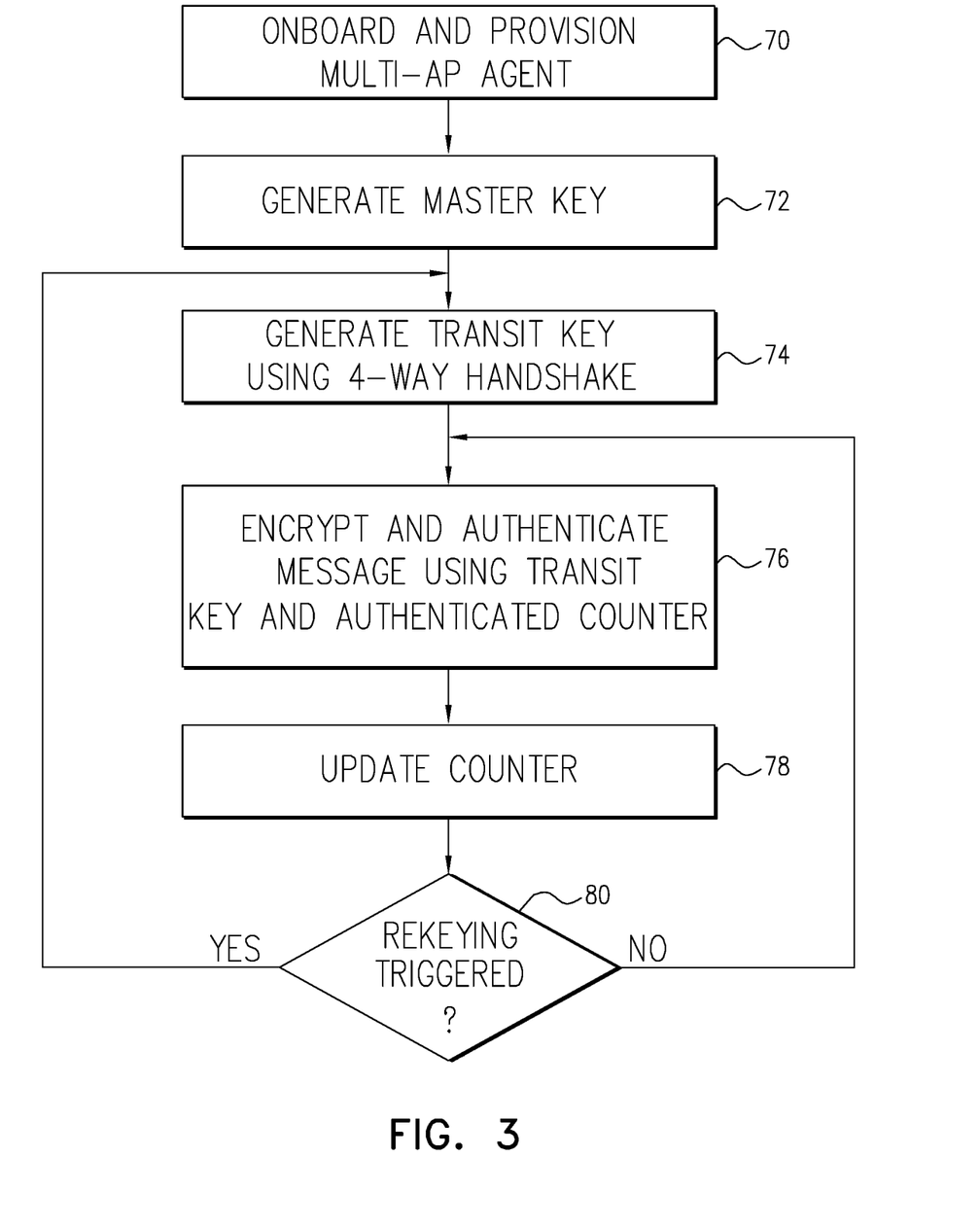
FIG. 3 is a flow chart that schematically illustrates a method for secure messaging in a multi-AP network, in accordance with an embodiment of the invention.

FIG. 3 is a flow chart that schematically illustrates a method for secure messaging in the multi-AP network of WLAN system 20, in accordance with an embodiment of the invention. For the sake of concreteness and clarity, the method will be described with specific reference to communications between multi-AP controller 40 in AP 22 and multi-AP agent 44 in AP 24; but the method may be similarly applied to any of the APs in system 20, irrespective of the number of physical links that are traversed between the respective interfaces 36 of the APs in question.

The method of FIG. 3 is initiated upon startup of system 20 or connection of AP 24 to the system. Multi-AP controller 40 onboards and provisions multi-AP agent 44 in AP 24 in an onboarding step 70. This step typically uses the device provisioning protocol (DPP) described above, together with the built-in public and private encryption key pair of AP 24. As a result of this process, multi-AP controller 40 receives and stores the public encryption key of AP 24. Multi-AP controller 40 and agent 44 use these key pair values in provisioning a shared master key—the PMK, in a master key generation step 72. The PMK is generated in the present example by performing a handshaking process over backhaul link 32, as described in the above-mentioned IEEE 802.11i standard. Thereafter the PMK remains fixed and is typically not used directly in subsequent message encryption.

Rather, multi-AP controller 40 and agent 44 use the PMK in generating a transit key—the PTK, in a transit key generation step 74. The transit key is generated in this embodiment using the four-way handshake defined by IEEE 802.11i, based on the PMK (which is known to both controller 40 and agent 44) and respective nonce values that controller 40 and agent 44 transmit one to the other. Alternatively, other methods of shared key generation that are known in the art may be used in generating the transit key. Multi-AP controller 40 and agent 44 apply the transit key in encrypting and authenticating messages that they transmit one to the other over backhaul link 32, at an encryption step 76. As a part of this process, multi-AP controller 40 and agent 44 each maintain a message counter and/or timer, which applies successive sequence indicators (such as sequence numbers and/or time stamps) to the messages. After each message, the counter and/or timer is updated, at an update step 78. These sequence indicators are applied in authenticated encryption of the messages, as described further hereinbelow with reference to FIG. 4.

After each message has been transmitted, multi-AP controller 40 and agent 44 check whether a rekeying event has occurred, at a rekeying trigger step 80. If not, encryption and authentication of the next message will continue at step 76 using the same transit key as in the previous message. On the other hand, when a rekeying event is detected, multi-AP controller 40 and agent 44 return to step 74 and repeat the four-way handshake, using the same PMK but new nonce values, to generate a new transit key. This new key is used in subsequent iterations through steps 76 and 78, until a further rekeying event is encountered.

One or more of a variety of types of rekeying events may be detected at step 80, for example:

Either multi-AP controller 40 or agent 44, or both, may maintain a timer, which runs as long as the connection between controller 40 and agent 44 is maintained. When the timer reaches a predefined expiration value, rekeying is initiated, and the timer is restarted.

When the message sequence number reaches a predefined limit, rekeying is initiated. The sequence number may then return to some initial value or, alternatively, the limit may be set to a new value.

When multi-AP controller 40 or agent 44 transmits or receives a control message that causes or otherwise reflects a change in the network topology of system 20, rekeying is initiated. The network topology in this case may relate to either the backhaul network or the fronthaul network, or both. For instance, rekeying may be initiated when controller 40 sends agent 44 a message indicating that a given STA 30 is to be steered to a certain BSS, such as to the BSS of AP 26.

Rekeying in response to network topology changes and other network-related events is particularly useful since such events—although usually legitimate—can also be indicative of an illegitimate attempt to intervene in network operations.

Figure 4:
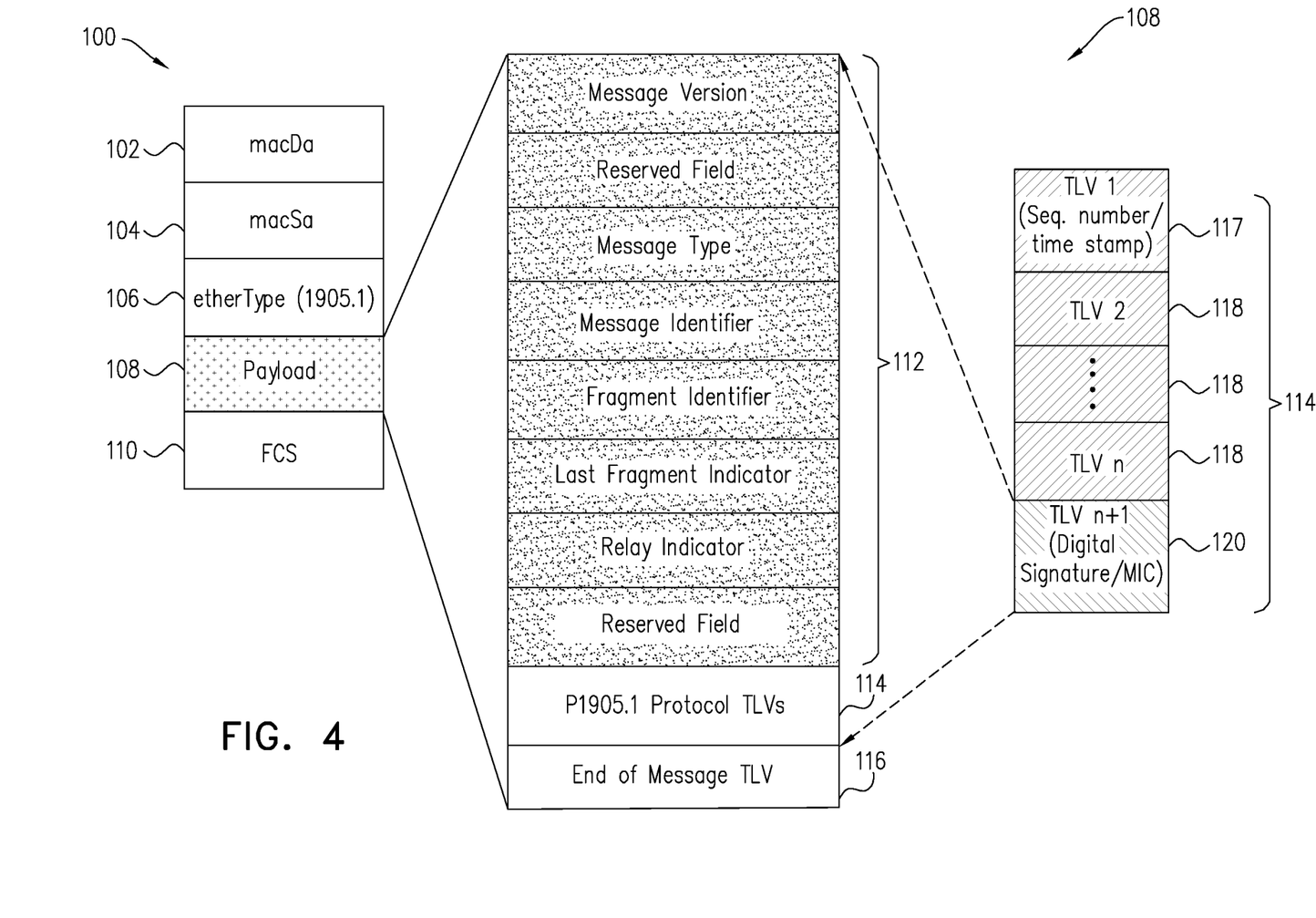
FIG. 4 is a block diagram that schematically illustrates the structure of a secure message exchanged between APs, in accordance with an embodiment of the invention.

FIG. 4 is a block diagram that schematically illustrates the structure of a secure message exchanged between multi-AP controller 40 and agent 44, in accordance with another embodiment of the invention. The message is contained in a data packet 100 complying with the IEEE 1905.1 protocol mentioned above. Packet 100 comprises a medium access control (MAC) destination address 102 and source address 104, along with an EtherType field 106 specifying that a payload 108 of packet 100 contains an IEEE 1905.1 message. Packet 100 ends with a frame check sequence 110.

Payload 108 of packet 100 contains a protocol header 112, as specified by IEEE 1905.1, followed by a message payload 114 and an end-of-message TLV element 116. Message payload 114 comprises a sequence indicator TLV element 117, along with one or more TLV elements 118 containing control data, as defined by the IEEE 1905.1 specification, followed by a signature TLV element 120 containing a digital signature. The sequence indicator in TLV element 117 may comprise, for example, a message sequence number (i.e., a packet sequence number in the present example) or a time stamp, or both, and serves as associated data in computation of the digital signature for the purpose of authenticating packet 100.

The multi-AP controller 40 or agent 44 transmitting message payload 114 computes the digital signature in TLV element 120 over header 112 and the preceding TLV elements 117 and 118. The control data in TLV elements 118 are encrypted, for example using the transit key defined above (although alternatively, other sorts of cryptographic keys may be used). The digital signature may have the form of a message integrity code (MIC) or method authentication code (MAC), which can be used by the receiving party as an authentication value in verifying the authenticity of the encrypted data in TLV elements 118. The addition of the sequence indicator in TLV element 117 as associated data enables the receiving party to verify that packet 100 contains an original transmission by the transmitting party and has not been replayed by an attacker.

In some embodiments, multi-AP controller 40 and agent 44 encrypt the control data in TLV elements 118 and compute the MIC or MAC, as defined above, in TLV element 120 using an authenticated encryption method with a synthetic initialization vector (SIV) containing the associated data. (The SIV is "synthetic" in the sense that it is synthesized as part of the encryption process.) A method of this sort is described, for example, by Harkins in Request for Comments (RFC) 5297 of the Network Working Group, published by the Internet Engineering Task Force (IETF) at tools.ietf.org. This RFC describes the use of a synthetic initialization vector in conjunction with the Advanced Encryption Standard (AES). The synthetic initialization vector is a vector of strings, which is authenticated by the MIC but is not encrypted. By using the sequence indicator in TLV element 117 as associated data in AES-SIV encryption and authentication of the control data in TLV elements 118, the communications between multi-AP controller 40 and agent 44 are secured against both tampering and replay attacks by malicious parties. Alternatively, other sorts of authenticated encryption schemes may be used for this purpose, with other means for securely conveying the associated data along with the encrypted control data.

It is noted that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication in a wireless local area network (WLAN) system, the method comprising:
   onboarding, authenticating, and configuring respective basic service sets (BSSs) of multiple access points in a multi-access point (multi-AP) network by a multi-AP controller, by communication over a backhaul network in the WLAN system between the multi-AP controller and respective multi-AP agents in the access points;
   generating respective cryptographic keys for the multi-AP agents by carrying out a handshaking procedure between the multi-AP controller and the multi-AP agents over the backhaul network;
exchanging messages between the multi-AP controller and the multi-AP agents over the backhaul network while encrypting and authenticating the messages using the respective cryptographic keys,
wherein exchanging the messages comprises applying successive sequence numbers to the messages;
upon detecting a predefined rekeying event in communications between the multi-AP controller and any given multi-AP agent, generating a new cryptographic key for the given multi-AP agent by repeating the handshaking procedure, and applying the new cryptographic key in encrypting and authenticating the messages following the rekeying event,
wherein detecting the rekeying event comprises detecting that the sequence numbers have reached a predefined limit; and
in response to the encrypted and authenticated messages received by the respective multi-AP agents, associating and communicating over wireless fronthaul links by the access points with client stations (STAs) in the WLAN system using the respective BSSs configured by the multi-AP controller.

2. The method according to claim 1, wherein detecting the rekeying event comprises detecting expiration of a timer.

3. The method according to claim 1, wherein detecting the rekeying event comprises detecting a change in a topology of the multi-AP network in response to the messages.

4. The method according to claim 3, wherein detecting the change in the topology comprises receiving a message with respect to steering of a STA to a given BSS.

5. The method according to claim 1, wherein encrypting and authenticating the messages exchanged between the between the multi-AP controller and the multi-AP agents comprises applying successive sequence indicators to the messages, and incorporating the successive sequence indicators as associated data in an authenticated encryption of the messages.

6. The method according to claim 5, wherein exchanging the messages comprises transmitting data packets, each data packet comprising a header and a payload containing a plurality of type-length-value (TLV) elements, including at least one first TLV element containing control data, a second TLV element containing the associated data, and a third TLV containing an authentication value, and wherein encrypting and authenticating the messages comprises computing the authentication value using the respective cryptographic keys and the associated data.

7. The method according to claim 1, wherein generating the cryptographic keys comprises provisioning respective fixed master keys of the multi-AP agents by communication over the backhaul network between the multi-AP controller and the onboarded multi-AP agents, and using the provisioned master keys, generating respective transit keys for use in encrypting and authenticating the messages.

8. A method for communication in a wireless local area network (WLAN) system, the method comprising:
onboarding, authenticating, and configuring respective basic service sets (BSSs) of multiple access points in a multi-access point (multi-AP) network by a multi-AP controller, by communication between the multi-AP controller and respective multi-AP agents in the access points over a backhaul network in the WLAN system;
generating respective cryptographic keys for the multi-AP agents by carrying out a handshaking procedure between the multi-AP controller and the multi-AP agents over the backhaul network;
exchanging messages, having respective, successive sequence indicators, between the multi-AP controller and the multi-AP agents over the backhaul network while encrypting and authenticating the messages using the respective cryptographic keys and incorporating the respective sequence indicators as associated data in the encrypted and authenticated messages,
wherein the sequence indicators comprise time stamps, and wherein exchanging the messages comprises incrementing the time stamps over a period of time during which the messages are transmitted; and
in response to the encrypted and authenticated messages received by the respective multi-AP agents, associating and communicating over wireless fronthaul links by the access points with client stations (STAs) in the WLAN system using the respective BSSs configured by the multi-AP controller.

9. The method according to claim 8, wherein exchanging the messages comprises transmitting data packets, each data packet comprising a header and a payload containing a plurality of type-length-value (TLV) elements, including at least one first TLV element containing control data, a second TLV element containing the associated data, and a third TLV containing an authentication value, and wherein encrypting and authenticating the messages comprises computing the authentication value using the respective cryptographic keys and the associated data.

10. The method according to claim 9, wherein computing the authentication value comprises calculating a synthetic initialization vector.

11. The method according to claim 8, wherein the sequence indicators comprise message sequence numbers, and wherein exchanging the messages comprises incrementing the message sequence numbers over a succession of the messages.

12. A wireless local area network (WLAN) system, comprising:
a plurality of access points (APs), which are configured to associate and communicate over wireless fronthaul links with client stations (STAs) in the WLAN system using respective basic service sets (BSSs) under control of respective multi-access point (multi-AP) agents running in the access points; and
a multi-access point (multi-AP) controller configured to communicate over a backhaul network in the WLAN system with the respective multi-AP agents in the access points so as to onboard, authenticate, and configure the respective BSSs of the access points to define a multi-AP network,
wherein the multi-AP controller and multi-AP agents are configured to generate respective cryptographic keys for the multi-AP agents by carrying out a handshaking procedure between the multi-AP controller and the multi-AP agents over the backhaul network, and to exchange messages over the backhaul network while encrypting and authenticating the messages using the respective cryptographic keys, and
wherein the multi-AP controller and multi-AP agents are configured to detect a predefined rekeying event in communications between the multi-AP controller and any given multi-AP agent, to generate a new cryptographic key for the given multi-AP agent by repeating the handshaking procedure, and to apply the new cryptographic key in encrypting and authenticating the messages following the rekeying trigger, wherein the multi-AP controller and multi-AP agents are configured to apply successive sequence numbers to the messages, and wherein detecting the rekeying event comprises detecting that the sequence numbers have reached a predefined limit.

13. The system according to claim 12, wherein detecting the rekeying event comprises detecting expiration of a timer.

14. The system according to claim 12, wherein detecting the rekeying event comprises detecting a change in a topology of the multi-AP network in response to the messages.

15. The system according to claim 12, wherein the multi-AP control and multi-AP agents are configured to provision respective fixed master keys of the multi-AP agents by communication over the backhaul network between the multi-AP controller and the multi-AP agents, and to apply the provisioned master keys in generating respective transit keys for use in encrypting and authenticating the messages.

16. The system according to claim 12, wherein the multi-AP controller and multi-AP agents are configured to apply successive sequence indicators to the messages, and to incorporate the successive sequence indicators as associated data in an authenticated encryption of the messages.

17. The system according to claim 12, wherein the messages comprises data packets exchanged by the multi-AP controller and multi-AP agents, each data packet comprising a header and a payload containing a plurality of type-length-value (TLV) elements, including at least one first TLV element containing control data, a second TLV element containing the associated data, and a third TLV containing an authentication value, and wherein the multi-AP controller and multi-AP agents are configured to compute the authentication value using the respective cryptographic keys and the associated data.

* * * * *